(12) United States Patent
Burns, III

(10) Patent No.: US 7,810,274 B2
(45) Date of Patent: Oct. 12, 2010

(54) CUSTOM ROD WITH SENSOR RING HANDLE

(75) Inventor: Joe Franklin Burns, III, 1511 Lee St., Cleveland, TN (US) 37311

(73) Assignee: Joe Franklin Burns, III, Cleveland, TN (US)

(*) Notice: Subject to any disclaimer, the term of this patent is extended or adjusted under 35 U.S.C. 154(b) by 0 days.

(21) Appl. No.: 11/656,583

(22) Filed: Jan. 22, 2007

(65) Prior Publication Data

US 2007/0220799 A1 Sep. 27, 2007

Related U.S. Application Data

(60) Provisional application No. 60/761,195, filed on Jan. 23, 2006.

(51) Int. Cl.
*A01K 87/00* (2006.01)

(52) U.S. Cl. .................. 43/23; 43/18.1 CT; 43/18.1 R

(58) Field of Classification Search ............... 43/23
See application file for complete search history.

(56) References Cited

U.S. PATENT DOCUMENTS

| | | | | |
|---|---|---|---|---|
| 1,839,751 A | * | 1/1932 | Fenton | 43/23 |
| 1,931,303 A | * | 10/1933 | Sturgis | 43/23 |
| 2,177,433 A | * | 10/1939 | Hedge | 43/23 |
| 2,711,047 A | * | 6/1955 | Shepherd | 43/23 |
| 2,839,864 A | * | 6/1958 | Martin | 43/23 |
| 4,384,425 A | | 5/1983 | Lemons, Sr. | |
| 4,398,369 A | | 8/1983 | Wiebe | |
| 4,510,709 A | | 4/1985 | Melcher | |
| 4,577,432 A | * | 3/1986 | Brackett et al. | 43/23 |
| 4,631,853 A | * | 12/1986 | Brackett et al. | 43/23 |
| 5,048,223 A | | 9/1991 | Yamamoto et al. | |
| 5,063,373 A | | 11/1991 | Lindsley | |
| 5,735,073 A | | 4/1998 | Kuhlman | |
| 5,867,931 A | | 2/1999 | Morris et al. | |
| 5,910,004 A | | 6/1999 | Antosh | |
| 6,094,851 A | | 8/2000 | Guidry | |
| 6,314,617 B1 | * | 11/2001 | Hastings | 16/436 |
| 6,629,382 B2 | | 10/2003 | Irrgang et al. | |
| 7,003,912 B1 | | 2/2006 | Morgan et al. | |
| 7,017,296 B2 | | 3/2006 | Templeman et al. | |
| 7,140,144 B1 | | 11/2006 | Morgan et al. | |

(Continued)

*Primary Examiner*—Christopher P Ellis
(74) *Attorney, Agent, or Firm*—John S. Paniaguas; Katten Muchin Rosenman LLP

(57) ABSTRACT

A handle for a fishing rod is disclosed which provides increased sensitivity to vibration. In particular, the handle is formed from a plurality of cork rings and a plurality of sensor disks having a relatively higher flexural stiffness than cork, such as graphite rings. The principles of the present invention may be used with virtually any type of fishing rod handle, such as a handle with a reel seat for a bait caster reel; a handle with a reel seat for use with a spinning reel and a handle without a reel seat, also known as a Tennessee style handle and assembled to a rod blank to form a fishing rod. Since the handle is formed from both cork rings and sensor disks having a relatively higher flexural stiffness than cork, the handle in accordance with the present invention provides increased sensitivity to vibration relative to a cork handle while at the same time provides the same feel as a handle formed from cork that is not as brittle or susceptible to breakage as an all graphite handle.

15 Claims, 3 Drawing Sheets

U.S. PATENT DOCUMENTS

2003/0159325 A1 8/2003 Templeman et al.
2003/0188471 A1 10/2003 Ahn
2004/0231223 A1 11/2004 Vogts
2006/0185218 A1 8/2006 Whiting

* cited by examiner

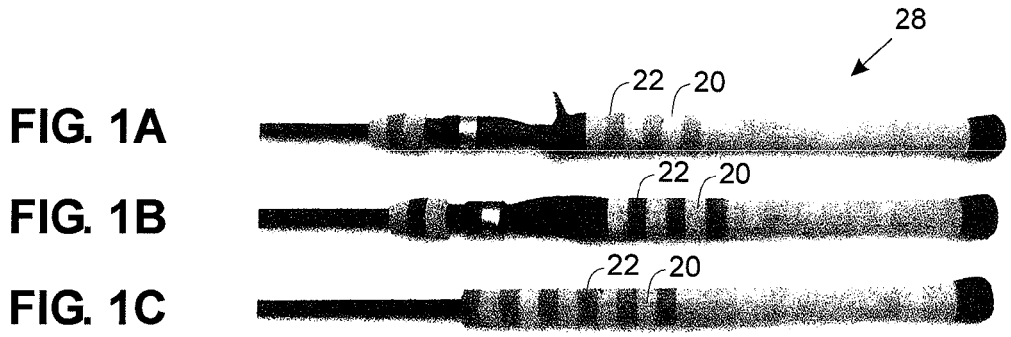
FIG. 1A
FIG. 1B
FIG. 1C
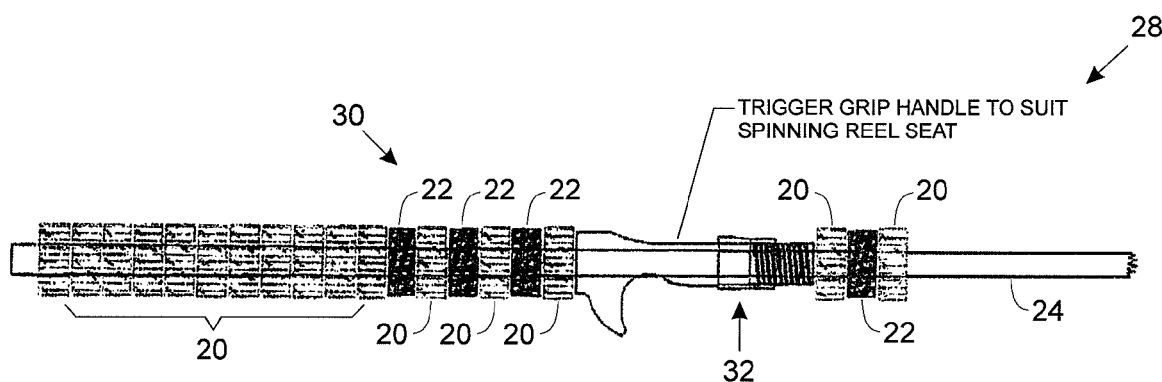
FIG. 2
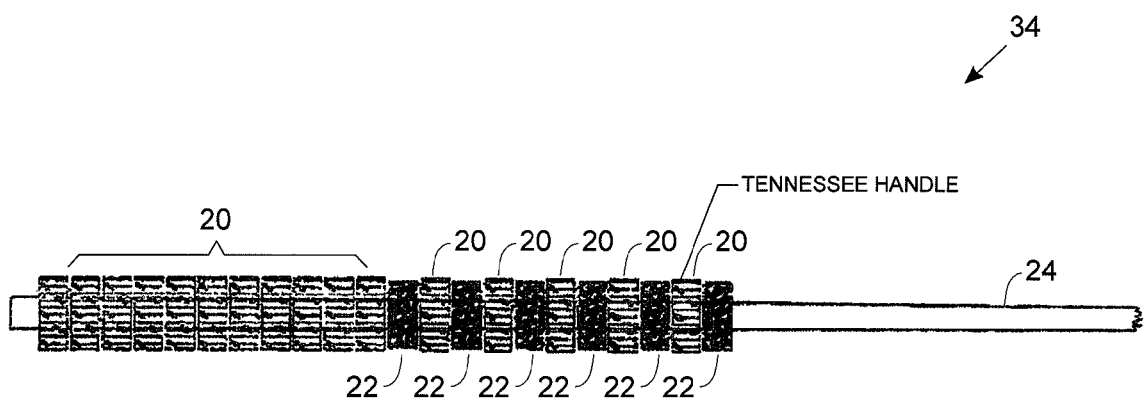
FIG. 3

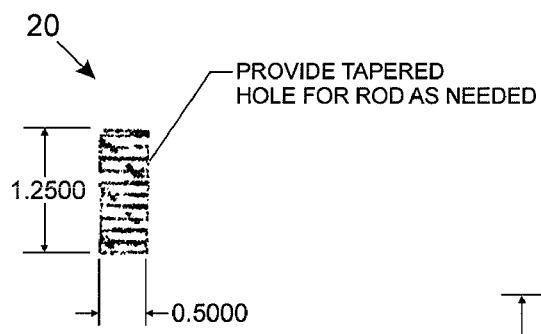
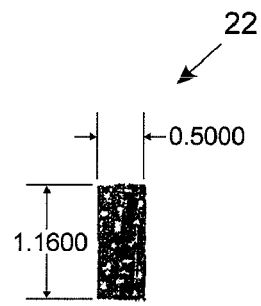
FIG. 4A  FIG. 4B
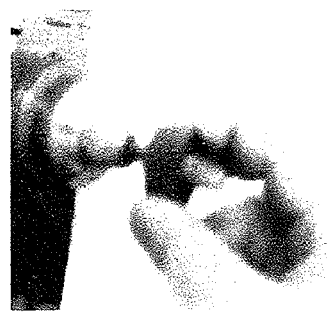
FIG. 5A  FIG. 5B
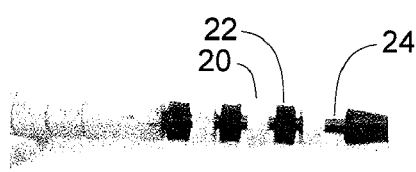
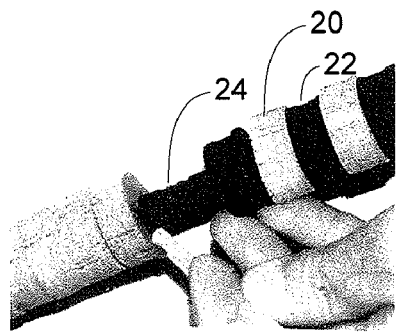
FIG. 5C  FIG. 5D

CUSTOM ROD WITH SENSOR RING HANDLE

CROSS REFERENCE TO RELATED APPLICATIONS

This application claims priority and the benefit of U.S. Provisional Application No. 60/761,195, filed on Jan. 23, 2006, hereby incorporated by reference.

BACKGROUND OF THE INVENTION

1. Field of the Invention

The present invention relates to a fishing rod and more particularly to a fishing rod handle formed with one or more cork rings and one or more sensor disks which improve the sensitivity and feel of the rod that is not as brittle or as susceptible to damage as an all graphite handle.

2. Description of the Prior Art

Bobber fishing is well known and involves the use of a bobber attached some distance from a fish hook or attached to the end of a fishing line. After the line with bait is cast into the water, the bobber floats on top of the water. When a fish "hits" the hook with bait, the bobber bobs on the surface and thus provides an indication to the fisherman that a fish is "hitting" the bait. Bobber fishing is fairly static in that after the line is cast into the water, the fisherman simply waits for the bobber to bob. While bobber fishing is great for novice fisherman, bobber fishing is limited in the types of fish for which it can be used and is normally used for pan fish, such as blue gill and crappie.

For certain types of fish, such as cat fish which are known to scavenge along water beds, a line is cast out so that the baited hook can rest or be "trolled" along the floor of a waterway basin. Still other types of fish, such as bass, are attracted to moving fish lures. In these types of "bobber-less" fishing, the fisherman must rely on the vibrations of the fishing rod to detect when a fish is "hitting the line".

There have many developments in the art to indicate when a fish is hitting a line during bobber-less fishing. For example, U.S. Pat. Nos. 4,510,709; 5,063,373; 6,094,851 and 7,017,296 as well as US Patent Application No. US 2003/0159325 A1 all disclose devices for fishing rod holders that include some type of sensor for detecting a vibration in the fishing rod or line of the fishing rod being held. The major drawback of this type of device is that it is only useful with fishing rod holders.

Still other developments which increase a fisherman's awareness to vibrations of a fishing line, indicative of a fish hitting a lure or a baited hook, relate to modifications to standard fishing rods. These modifications fall into two categories. The first category relates to the addition of sensors or other components to a fishing rod. The second category relates to the construction of the fishing rod.

The first category includes two sub-categories: mechanical and electronic. With respect to the mechanical sub-category, U.S. Pat. No. 5,910,004 discloses a fishing rod which includes a wrist strap, attached to one end. In this device, any vibrations in the fishing line are translated to a fisherman's forearm. This device is not useful for fishermen with long sleeve shirts or jackets and is cumbersome for the fisherman. British patent publication No. GB 2 398 716 discloses a mechanical arrangement which includes a pivotably mounted lever arm with a wire loop or eye mounted on one end. An axially moveable weight is mounted on the lever arm which allows the sensitivity of the device to be adjusted. A magnet is rigidly attached to the fishing rod. During normal operation, the lever arm is displaced away from the fishing rod. Vibrations in the line cause the lever to rotate toward the fishing rod and removeably attached thereto by the magnet. These types of devices include moving parts and are thus subject to wear and misoperation due to misalignment of the components and are thus complex from a manufacturing standpoint or are cumbersome to use. US Patent Application Publication No. US 2004/0231233 A1 discloses an "amplified" fishing rod handle. The amplified fishing rod handle is formed from a fishing rod with a hollow handle. A plurality of "vibration disks" is disposed in the handle. These vibration disks are in static contact with an interior wall of the handle and the rod. The main drawback with such a configuration is that the effectiveness of the vibration disks will be affected by the medium in which they are immersed. Should the fishing rod inadvertently become immersed in the water so that the hollow handle cavity even partially fills up with water, the sensitivity will be drastically changed.

In order to avoid the problems associated with mechanical type devices as mentioned above, a number of devices for improving a fisherman's awareness of vibrations in a fishing line utilize electronic sensors. Examples of such devices are disclosed in U.S. Pat. Nos. 4,384,425; 5,735,073; 5,867,931; 7,003,912 and 7,140,144 as well as Japanese Patent Application Publication Nos. JP 6125681 and JP 2006067982. In general, the devices disclosed in these patents and publications involve the addition of an electronic sensor, such as an accelerometer or electric contact assembly, for sensing vibrations in a fishing line. There are several drawbacks with these types of devices. First, such devices necessitate a battery or other portable power supply. Second, such devices may be subject to catastrophic failure if the fishing rod inadvertently gets submersed in the water.

In order avoid the problems mentioned above, fishing rods have been developed which provide increased sensitivity in the handle without the use of additional mechanical or electronic devices, as mentioned above, for sensing vibrations in fishing rods. Examples of such fishing rods are disclosed in U.S. Pat. Nos. 4,577,432; 4,631,853; US Patent Application Publications US 2003/0188471 A1; US 2006/0185218 A1; and Japanese Patent Application Publication Nos. JP 1063327; JP 7099863; JP 9149747; JP 9149748; JP 2001148972; JP 2001178317; JP 2001204306; JP 2003070391 JP 2003164240 and JP 2003230333.

U.S. Pat. Nos. 4,577,432 and 4,631,853 relate to a fishing rod with a contoured handle grip portion. By providing a contoured grip, normal vibrations are likely to be sensed by the user. However, these fishing rods do not increase or amplify vibrations. In order to increase or amplify vibrations, other known fishing rods have been developed using materials known to increase the flexural stiffness of the rod. For example, US Patent Application Publication No. US 2003/0188471 A1 as well as Japanese Patent Application Publications JP 7099863; JP 9149747; JP 9149748; JP 2001148972 and JP 2003230333 disclose fishing rods with metal reinforcement. Japanese Patent Application JP 2001204306 discloses a fishing rod which is formed with reinforcing ribs along the axis of the rod which increases the flexural stiffness. Such fishing rods are heavier than normal rods and/or have a different feel. US Patent Application Publication US 2006/0185218 A1 discloses a composite fishing rod in which a portion of the fishing rod is filament wound and another portion is not filament wound. Even though the composite fishing rod may have an increased flexural stiffness and thus provide increased sensitivity relative to a normal rod, such a composite rod is relatively complicated from a manufacturing standpoint.

Japanese Patent Application Publications JP 1063327; JP 2001178317; and JP 2003070391 approach the problem of providing increased sensitivity of a fishing rod from a different standpoint. In particular, these publications relate to two piece rods and focus on minimizing vibration losses at the joints. Japanese Patent Application Publication No. JP 2003164240 relates to a fishing rod wire loop configuration configured to minimize contact between the fishing line and the wire loops until the rod is bent. The rods disclosed in these publications, however, do not provide increased sensitivity to vibration relative to one piece rods.

U.S. Pat. No. 4,398,369 discloses a graphite fishing rod with a graphite handle. Graphite has a higher flexural stiffness than cork. As such, the handle itself provides greater sensitivity to vibration than known fishing rods. Unfortunately, the graphite handle provides a different feel than fishing rods with cork handles. Moreover, graphite is relative brittle and thus is susceptible to breakage. Thus, there is a need for a fishing rod with improved sensitivity to vibration which has essentially the same feel as a fishing rod with a cork handle which is not as susceptible to breakage as an all graphite handle.

SUMMARY OF THE INVENTION

The present invention relates to a handle for a fishing rod which provides increased sensitivity to vibration. In particular, the handle is formed from a plurality of cork rings and a plurality of sensor disks having a relatively higher flexural stiffness than cork, such as graphite rings. The principles of the present invention may be used with virtually any type of fishing rod handle, such as a handle with a reel seat for a bait caster reel; a handle with a reel seat for use with a spinning reel and a handle without a reel seat, also known as a Tennessee style handle and assembled to a rod blank to form a fishing rod. Since the handle is formed from both cork rings and sensor disks having a relatively higher flexural stiffness than cork, the handle in accordance with the present invention provides increased sensitivity to vibration relative to a cork handle while at the same time provides the same feel as a handle formed from cork that is not as brittle or susceptible to breakage as an all graphite handle.

DESCRIPTION OF THE DRAWING

These and other advantages of the present invention will be readily understood with reference to the following specification and attached drawing wherein:

FIG. 1a is partial view of a fishing rod blank with a bait caster handle with a reel seat with a portion of the rod removed for clarity in accordance with the present invention.

FIG. 1b is similar to FIG. 1a but with a spinning handle with a reel seat.

FIG. 1c is similar to FIG. 1a but with a spinning handle without a reel seat also known as a Tennessee handle.

FIG. 2 is similar to FIG. 1a but with the butt cap removed for clarity.

FIG. 3 is similar to FIG. 1c but with the butt cap removed for clarity.

FIG. 4a is an elevational view of a cork disk for use with the present invention.

FIG. 4b is an elevational view of a sensor disk for use with the present invention.

FIGS. 5a-5f illustrate step by step process diagrams for forming a fishing rod handle in accordance with the present invention.

DETAILED DESCRIPTION

Figure 5E:
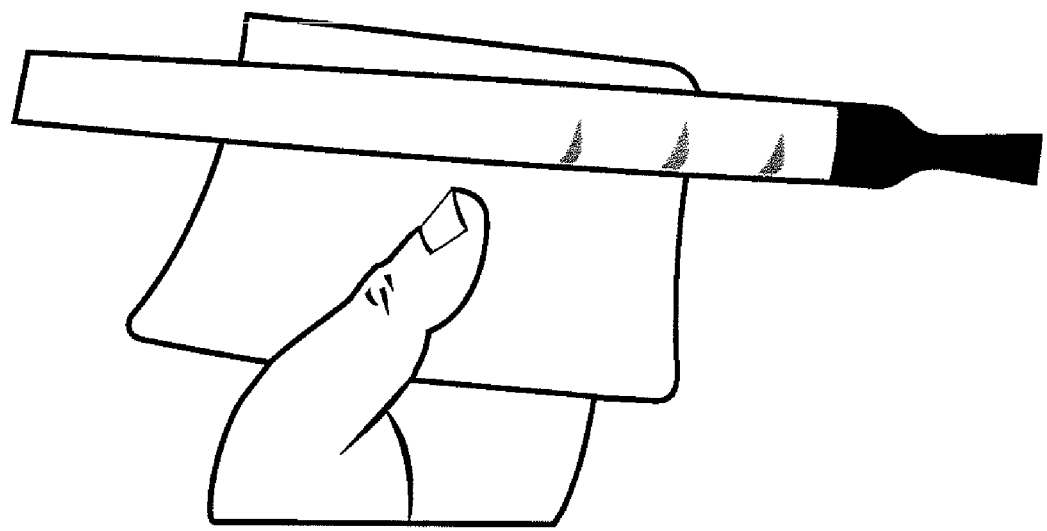
Figure 5F:
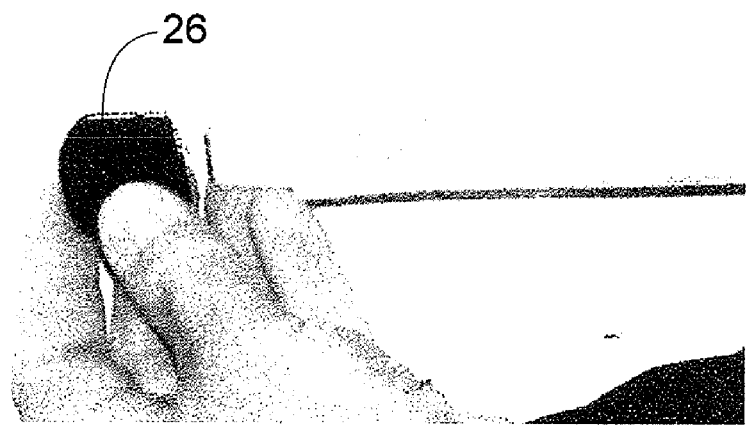

The present invention relates to a handle for a fishing rod which provides increased sensitivity to vibration. In particular, the handle is formed from a plurality of cork rings and a plurality of sensor disks having a relatively higher flexural stiffness than cork, such as graphite rings. The principles of the present invention may be used with virtually any type of fishing rod handle, such as a handle with a reel seat for a bait caster reel; a handle with a reel seat for use with a spinning reel and a handle without a reel seat, also known as a Tennessee style handle and assembled to a rod blank to form a fishing rod. Since the handle is formed from both cork rings and sensor disks having a relatively higher flexural stiffness than cork, the handle in accordance with the present invention provides increased sensitivity to vibration relative to a cork handle while at the same time provides the same feel as a handle formed from cork that is not as brittle or susceptible to breakage as an all graphite handle.

The principles of the present invention may be used with virtually any type of handle for a fishing rod, such as a bait caster handle with a reel seat; a spinning handle with a reel seat and a spinning handle without a reel seat, also known as a Tennessee style handle invention relates to fishing rod handles. The handles in accordance with the present invention are adapted to be assembled to a fishing rod blank to form a complete fishing rod. Assembly of the handle to a rod blank is well within the ordinary skill in the art, for example, as disclosed in U.S. Pat. No. 5,048,223.

An important aspect of the invention relates to the formation of the handle from cork rings and alternative rings having a relatively higher flexural stiffness than cork, for example, graphite rings in order to provide a handle with improved sensitivity to vibration relative to cork handles but not as brittle as graphite handles. Conventional fishing rod handles are normally formed from cork tubes or graphite tubes. Since cork has a lower flexural stiffness (i.e. more elastic) than graphite, handles formed from graphite provide improved sensitivity relative to cork handles. Unfortunately, as mentioned above, graphite is relatively brittle and is thus subject to damage. The present invention is able to provide a fishing rod handle that provides increased sensitivity while at the same time provides reduced fragility relative to all graphite handles.

Referring first to FIGS. 5a and 5b, a plurality of cork rings 20 and sensor disks 22 are formed. The cork rings may be, for example, Grade A Portuguese cork rings 1.25 inches×0.5 inches. The cork rings 20 may be purchased as rings or cut from a cork tube. Similarly, the sensor disks 22 may be, for example, 100% compressed graphite 1.25 inches×0.5 inches. Other materials are also suitable for the sensor disks 22 that have a higher flexural stiffness than cork. The sensor disks 22 may also formed by cutting a graphite tube, for example. As shown in FIGS. 5a and 5b, the cork rings 20 and the sensor disks 22 are reamed to the diameter of the rod blank 24. The number of cork rings 20 and sensor disks 22 determine the length of the handle.

In FIG. 5c, the cork rings 20 and sensor disks 22 are assembled on the rod blank 24 on the appropriate portion of the handle. For example, the sensor disks 22 may be placed about three inches behind the reel seats due to hand placement and for maximum sensitivity. For a spinning rod with no reel seat, the sensor disks 22 may be placed within the first six inches of a spinning rod with no reel seat. Such placement of the sensor disks 22 is due to normal hand placement, overall balance of the rod and provides maximum sensitivity. In general, the sensor disks 22 are placed between the cork rings 20 on the portion of the handle normally gripped by a user for maximum sensitivity and balance. Japanese Patent Application Publication No. JP2003106392, hereby incorporated by reference, discloses a method for evaluating the sensitivity of a fishing rod.

As shown in FIG. 5d, the cork rings 20 and sensor disks 22 are glued together and to the rod blank 24, for example with an adhesive, such as a two part co-polymer epoxy glue by Flexcoat Inc. Next, as shown in FIG. 5e, the cork rings 20 and sensor disks 22 may optionally be sanded to the desired. Finally, a foam or rubber butt cap is attached to the end of the rod handle.

FIG. 2 illustrates partially broken away fishing rod 28 which includes a partially broken away rod blank 24 and with a handle 30 which includes a trigger grip handle portion with a reel seat for a bait caster reel as shown or other reel seat 32, such as spinning reel in accordance with the present invention FIG. 3 is similar and illustrates a fishing rod 34 with handle 36 for use with a spinning reel with no reel seat.

Obviously, many modifications and variations of the present invention are possible in light of the above teachings. Thus, it is to be understood that, within the scope of the appended claims, the invention may be practiced otherwise than at specifically described above.

I claim:

1. A handle for a fishing rod comprising:
a rod blank having a handle, said handle defining a free end;
a plurality of first cork rings disposed on said handle of said rod blank adjacent said free end;
a hand grip formed adjacent said plurality of first cork rings, said hand grip comprising:
a plurality of sensor disks; and
a plurality of second cork rings; wherein said sensor disks are formed from a material having a relatively higher flexural stiffness than cork, and wherein at least one sensor disk is disposed between each of a plurality of pairs of second cork rings, said sensor disks providing sensitivity to vibration of said fishing rod.

2. The handle as recited in claim 1 further including a reel seat.

3. The handle as recited in claim 2 wherein said reel seat is for a bait caster reel.

4. The handle as recited in claim 2 wherein said reel seat is for a spinning reel.

5. The handle as recited in claim 1 wherein at least one of said sensor disks is formed from graphite.

6. The handle as recited in claim 1, wherein all of said first cork rings in have a uniform outer diameter.

7. The handle as recited in claim 1, wherein all of said first cork rings in have a uniform axial thickness.

8. The handle as recited in claim 1, wherein all of said second cork rings have a uniform outer diameter.

9. The handle as recited in claim 1, wherein all of said second cork rings have a uniform axial thickness.

10. The handle as recited in claim 1, wherein the sensor disks have the same outer diameter as the outer diameter of said first cork rings.

11. The handle as recited in claim 1, wherein the sensor disks have the same outer diameter as the outer diameter of said second cork rings.

12. The handle as recited in claim 1, wherein the sensor disks have the same outer diameter as the outer diameter as said first and second cork rings.

13. The handle as recited in claim 1, further including an adhesive for securing said second cork rings and said sensor rings together.

14. The handle as recited in claim 1, wherein the number of sensor disks is selected as a function of the sensitivity of said fishing rod to vibration relative to a fishing rod with all cork rings.

15. The handle as recited in claim 1 wherein said sensor disks are formed from graphite.

* * * * *